United States Patent [19]
Arlt et al.

[11] Patent Number: 5,136,013
[45] Date of Patent: Aug. 4, 1992

[54] PROCESS FOR THE PRODUCTION OF LOW-MELTING POLYMERS CONTAINING AT LEAST ONE Z-CONFIGURED STILBENE GROUP

[75] Inventors: Dieter Arlt, Cologne; Axel Bader, Bergisch Gladbach; Volker Eckhardt; Karsten-Josef Idel, both of Krefeld; Frank-Gerald Kleiner, Leverkusen, all of Fed. Rep. of Germany

[73] Assignee: Bayer Aktiengesellschaft, Leverkusen, Fed. Rep. of Germany

[21] Appl. No.: 498,553

[22] Filed: Mar. 26, 1990

[30] Foreign Application Priority Data

Apr. 7, 1989 [DE] Fed. Rep. of Germany ....... 3911220

[51] Int. Cl.$^5$ .................. C08G 63/02; C08G 63/18
[52] U.S. Cl. ................................. 528/192; 528/193
[58] Field of Search ................................. 528/192, 193

[56] References Cited

U.S. PATENT DOCUMENTS

| | | | |
|---|---|---|---|
| 3,801,528 | 4/1974 | Morgan | 528/336 |
| 4,248,998 | 2/1981 | Udovich et al. | 528/194 |
| 4,433,132 | 2/1984 | Rogers et al. | 528/192 |
| 4,728,719 | 3/1988 | Morris et al. | 528/272 |
| 4,728,720 | 3/1988 | Morris et al. | 528/272 |

Primary Examiner—Harold D. Anderson
Assistant Examiner—T. Mosley
Attorney, Agent, or Firm—Connolly and Hutz

[57] ABSTRACT

Low-melting polymers containing at least one Z-configured stilbene group are produced by reaction of Z-configured bifunctional stilbene compounds with bifunctional monomers, oligomers or relatively high molecular weight components at temperatures in the range from −30° to 250° C., optionally in the presence of organic solvents and/or diluents and/or catalysts, the Z-configuration of the stilbene units remaining intact. The low-melting polymers may be processed by standard methods to moldings of various kinds which may be converted by treatment of temperatures of 250° to 500° C. and/or by irradiation at wavelengths of 200 to 800 nm into high-melting plastics articles of high heat resistance.

7 Claims, No Drawings

PROCESS FOR THE PRODUCTION OF LOW-MELTING POLYMERS CONTAINING AT LEAST ONE Z-CONFIGURED STILBENE GROUP

This invention relates to a process for the production of low-melting, readily processible polymers containing at least one Z-configured stilbene group.

The practicability of new technologies depends to a large extent on the availability of suitable materials. New plastics which meet stringent demands with regard to heat resistance and resistance to chemicals are required for "high-tech" applications, above all in expanding markets, such as electrical engineering and electronics, transport and chemical plant construction.

Conventional thermoplastics are limited in their heat resistance. Although values of 260° C. can be achieved with poly(p-phenylene sulfide) and values of as high as 310° to 340° C. (HDT-A-T.) with polyether ketones, even higher heat resistance leads inevitably to problems in the processing of such products because the temperatures required for processing clearly exceed 400° C., i.e. the upper temperature limit typically encountered in the processing of thermoplastics.

To avoid high processing temperatures, polymers of high heat resistance can also be processed from solution. In the case of polyaramides, such as poly-(1,4-phenylene terephthalamide) or poly-(1,3-phenylene terephthalamide), fibers having extremely attractive properties can be spun in this way. However, in view of the high resistance to chemicals, i.e. poor solubility, it is necessary to use aggressive solvents of low volatility, such as concentrated sulfuric acid. Unfortunately, the difficulties involved in the removal of such solvents seriously restrict the range of application of the polymers in question.

JP-P 62/256825 describes polyesters of 1,4-bis-(4'-carboxystyryl)-benzene or stilbenedicarboxylic acid and tetraethylene glycol. The dicarboxylic acids used are a mixture of cis- and trans-configured species and, after polycondensation, may be quatitatively converted into the trans-configuration by heat treatment. Because aliphatic diols are used, polymers of high resistance to heat and chemicals are not obtained. The specific utilization of cis/trans isomerization to improve processibility is not described. The polymerization is carried out under conditions which promote conversion into the trans-configuration.

Accordingly, the problem addressed by the present invention was to provide a process for the production of low-melting and readily soluble, readily processible polymers which, after processing, can be specifically converted into plastics articles of high resistance to heat and, in particular, chemicals.

Accordingly, the present invention relates to a process for the production of low-melting polymers containing at least one Z-configured (the German designation for cis-configured) stilbene group, characterized in that Z-configured bifunctional stilbene compounds corresponding to formula (I)

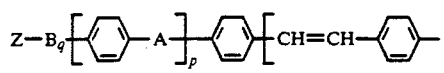
(I)

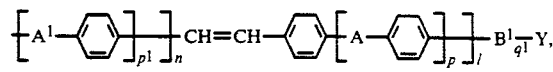

in which

Z and Y may be the same or different and represent COOR, COR, COCl, OCOCl, NCO, NRCOCl, NHR, OR or Cl with R=hydrogen or $C_{1-8}$ alkyl, A and $A^1$ may be the same or different and represent a chemical bond or CH=CH,

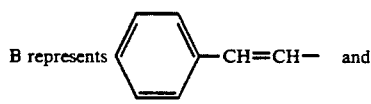

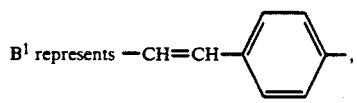

$l = 0$ or 1,
p and $p^1 = 0$ or 1,
q and $q^1 = 0$ or 1 and
$n = 1$ or 2, are reacted with bifunctional monomers, oligomers or relatively high molecular weight components, which are known to be suitable for the synthesis of polyesters, polycarbonates, polyamides, polyurethanes, polyethers or polyphenylene sulfides, at temperatures in the range from $-30°$ to $250°$ C. and preferably at temperatures in the range from $-10°$ to $100°$ C., optionally in the presence of organic solvents and/or diluents and/or catalysts, the Z-configuration of the stilbene units remaining intact.

Preferred stilbene compounds of formula (I) containing at least one Z-configured double bond are, for example, 4,4'-stilbenedicarboxylic acid and diacid chlorides and diesters thereof, 4,4'-dihydroxystilbene and corresponding bischlorocarbonic acid esters, 4,4'-diaminostilbene, 4,4'-diisocyanatostilbene, 4,4'-di-(N-methyl)-aminostilbene, 4,4'-dichlorostilbene, 1,2-bis-(4-carboxybiphenyl)-ethene and diacid chlorides and diesters thereof, 1,2-bis-(4-hydroxybiphenyl)-ethene and corresponding bischlorocarbonic acid esters, 1,2-bis-(4-aminobiphenyl)-ethene, 1,2-bis-(4-isocyanatobiphenyl)-ethene, 1,2-bis-(4-N-methylaminobiphenyl)-ethene,1,2-bis-(4-mercaptobiphenyl)-ethene, 1,2-bis-(4-bromobiphenyl)-ethene, 1,2-bis-(4-chlorobiphenyl)-ethene, 1-(4-carboxybiphenyl)-2-(4-carboxyphenyl)-ethene and diacid chlorides and diesters thereof, 1-(4-hydroxybiphenyl)-2-(4-hydroxyphenyl)-ethene and corresponding bis-chlorocarbonic acid esters, 1-(4-aminobiphenyl)-2-(4-aminophenyl)-ethene, 1,4-isocyanatobiphenyl-2-(4-isocyanatophenyl)-ethene,1-(4-N-methylaminobiphenyl)-2-(4-N-methylaminophenyl)-ethene, 1-(4-mercaptobiphenyl)-2-(4-mercaptophenyl)-ethene, 1-(4-bromobiphenyl)-2-(4-mercaptophenyl)-ethene, 1-(4-bromo-biphenyl)-2-(4bromophenyl)-ethene, 1-(4-chlorobiphenyl)-2-(4-chlorophenyl)-ethene, 1,4-bis-(4-carboxystyryl)-benzene and diacid chlorides and diesters thereof, 1,4-bis-(4-hydroxystyryl)-benzene and corresponding bischlorocarbonic acid esters, 1,4-bis-(4-aminostyryl)-benzene,1,4-bis-(4-isocyanatostyryl)-benzene, 1,4-bis-(4-N-methylamino-styryl)-benzene, 1,4-bis-(4-mercaptostyryl)-benzene, 1,4-bis-(4-bromostyryl)-benzene, 1,4-bis-(4-chlorostyryl)-benzene,1-(4-hydroxyphenyl)-2-(4-carboxyphenyl)-ethene, 1-(4-aminophenyl)-2-(4-carboxyphenyl)-ethene, 1-(4-aminophenyl)-2-(4-hydroxyphenyl)-ethene, 1-(4-chlorophenyl)-2-(4-hydroxyphenyl)-ethene and 1-(4-chlorophenyl)-2-(4-mercaptophenyl)-ethene; 4,4'-bis-(4-carboxystyryl)-stilbene and diacid chlorides and diesters thereof, 4,4'-bis-(4-hydroxystyryl)-stilbene and corresponding bischlorocarbonic acid esters, 4,4'-bis-(4-aminostyryl)-stilbene, 4,4'-bis-(4-isocyanatostyryl)-stilbene, 4,4'-bis-(4-N-methylaminostyryl)-stilbene, 4,4'-bis-(4-chlorostyryl)-stilbene, 4,4'-bis-(4-bromostyryl)-stilbene, 4,4'-bis-(4-carboxystyryl)-biphenyl and diacid chlorides and diesters thereof, 4,4'-bis-(4-hydroxystyryl)-biphenyl and corresponding bischlorocarbonic acid esters, 4,4'-bis-(4-aminostyryl)-biphenyl, 4,4'-bis-(4-isocyanatostyryl)-biphenyl, 4,4'-bis-(4-N-methylaminostyryl)-biphenyl, 4,4'-bis-(4-chlorostyryl)-biphenyl, 4,4'-bis-(4-bromostyryl)-biphenyl. 4,4'-Stilbenedicarboxylic acid and 4,4'-stilbenedicarboxylic acid dichloride are particularly preferred. The Z-configured stilbene compounds may be prepared by compounds corresponding to the following formula

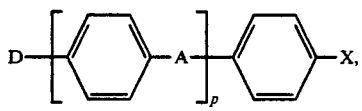
(II)

wherein

A and p have the meaning indicated above,

D denotes $COOR^1$, $COR^1$, $NHR^2$, $NO_2$, $OR^3$, Cl or Br, where $R^1$=hydrogen or branched or straight chained $C_1$-$C_8$-alkyl, $R^2$=OAc, $COOC_2H_5$ or another suitable protective group and $R^3$=OAc,

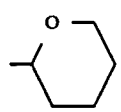

or another suitable protective group and

X stands for bromine or iodine are reacted with an acetylene corresponding to the following formula $HC{\equiv}C-R^4$ (III), wherein $R^4$ stands for

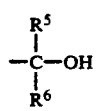

or $Si(R^5)_3$, where $R^5$ and $R^6$=$C_1$-$C_4$-alkyl, at temperatures from 30° to 160° C. in the presence of a palladium catalyst and a base, the resulting compounds are converted in the presence of a base into compounds corresponding to the following formula

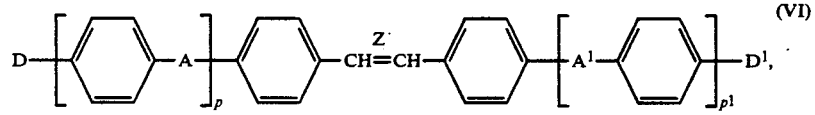
(IV)

wherein D, A and p have the meanings indicated above, and the compounds of formula (IV) are then reacted with compounds corresponding to the following formula

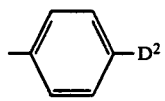
(V)

wherein $D^1$, $A^1$ and $p^1$ have the meanings described for A, D and p and

X stands for bromine or iodine at temperatures from 30° to 160° C. in the presence of a palladium catalyst and a base and the resulting acetylene compounds are reduced with hydrogen or another reducing agent in the presence of catalysts to form Z-stilbene compounds corresponding to the following formula

(VI)

wherein D, $D^1$, A, $A^1$ and p and $p^1$ have the meaning indicated above, and the functional groups D and $D^1$ are converted into the above mentioned functional groups Z and Y of formula (I) in known manner or when D and $D^1$ stand for at least one bromine atom, the Z-stilbene compounds of formula (VI) are reacted with compounds corresponding to the following formula $H_2C{=}CHR^7$ (VII)

wherein $R^7$ stands for hydrogen or

where $D^2$ has the meaning given above for $D^1$ at temperatures from 30° to 160° C. in the presence of a palladium catalyst and a base, and the functional groups D, $D^1$ and $D^2$ are converted into the functional groups Z and Y of formula (I) in the usual manner or the compounds of formula (IV) are reacted with compounds corresponding to the following formula

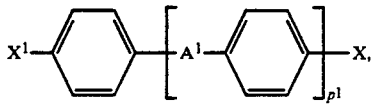
(VIII)

wherein $A^1$ X and $p^1$ have the meanings indicated above and $X^1$ stands for bromine or iodine at temperatures from 30° to 160° C. in the presence of a palladium catalyst and a base and the resulting acetylene compounds are then reduced to the corresponding Z-stilbene compounds with hydrogen or other reducing agents in the presence of catalysts and the functional groups D are then converted into functional groups Z and Y of formula (I) in known manner.

The reaction of the aromatic halides of the general formula II with acetylenes of formula (III) may be carried out by a method which is already known in principle (see e.g. A. Segnitz in Houben-Weyl, Vol. 13/9b, pages 987 et seq). According to this method, the reaction is carried out in the presence of a palladium catalyst and the compound which is basic in reaction, optionally in the presence of a cocatalyst, a phosphane and a solvent and/or diluent at temperatures of about 30° to 160° C., preferably from 40° to 130° C.

This reaction gives rise to compounds corresponding to the following general formula (IX)

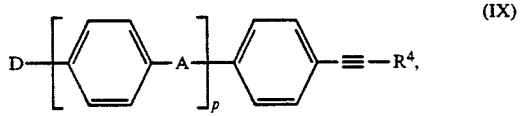

wherein D, A, p and $R^4$ have the meanings indicated above.

Examples of preferred aromatic halides of formula (II) include those in which A stands for a chemical bond or CH=CH, X stands for bromine or iodine, p stands for 0 or 1 and D stands for $COOR^1$, $COR^1$, $NHR^2$, $NO_2$, $OR^3$, Cl or Br, where $R^1$=hydrogen or branched or straight chained $C_1$-$C_8$-alkyl, $R^2$=OAc, $COOC_2H_5$ or another suitable protective group and $R^3$=OAc,

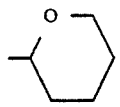

or another suitable protective group.

The following are given as examples of aromatic halides corresponding to formula (II): 4-Bromobenzoic acid, 4-bromobenzoic acid methyl ester, 4-bromobenzoic acid ethyl ester, 4-bromobenzoic acid-n-propyl ester, 4-bromobenzoic acid-i-propyl ester, 4-bromobenzoic acid-n-butyl ester, 4-bromobenzoic acid-i-butyl ester, 4-bromobenzoic acid tert.-butyl ester, 4-bromobenzoic acid-n-pentyl ester, 4-bromonitrobenzene, 4-bromobenzaldehyde, 4-acetoxybromobenzene, 4-acetoxy iodobenzene, 4-bromophenyl tetrahydropyranyl ether, 4-iodophenyl tetrahydropyranyl ether, 1,4-dibromobenzene, 1-bromo-4-iodobenzene, 4-bromoacetophenone, (4-bromophenyl)-ethyl ketone, (4-bromophenyl)-n-propyl ketone, (4-bromophenyl)-i-propyl ketone, (4-bromophenyl)-n-butyl ketone, 4-bromoacetanilide, 4-iodoacetanilide, 4-bromophenyl carbamic acid ethyl ester, 1-bromo-4-chlorobenzene, 1-chloro-4-iodobenzene, 4-bromobiphenyl-4'-carboxylic acid methyl ester, 4-bromobiphenyl-4'-carboxylic acid ethyl ester, 4-bromobiphenyl-4'-carboxylic acid n-propyl ester, 4-bromobiphenyl-4'-carboxylic acid i-propyl ester, 4-bromobiphenyl-4'-carboxylic acid n-butyl ester, 4-bromobiphenyl-4'-carboxylic acid i-butyl ester, 4-bromobiphenyl-4'-carboxylic acid tert.-butyl ester, 4-bromobiphenyl-4'-carboxylic acid-n-pentyl ester, 4-bromo-4'-nitrobiphenyl, 4-acetoxy-4'-bromobiphenyl, 4-bromobiphenyl-4'-tetrahydropyranyl ether, 4-bromo-4'-iodobiphenyl, 4,4'-dibromobiphenyl, 4-bromo-4'-chlorobiphenyl, (4-bromobiphenyl-4'-yl)-methyl ketone, (4-bromobiphenyl-4'-yl)-ethyl ketone, (4-bromobiphenyl-4'-yl)-n-propyl ketone, (4-bromobiphenyl-4'-yl)-i-propyl ketone, (4-bromobiphenyl-4'-yl)-n-butyl ketone, 4-acetamino-4'-bromobiphenyl, 4-bromobiphenyl-4'-carbamic acid ethyl ester, 4-bromostilbene-4'-carboxylic acid methyl ester, 4-bromostilbene-4'-carboxylic acid ethyl ester, 4-bromostilbene-4'-carboxylic acid n-propyl ester, 4-bromostilbene-4'-carboxylic acid n-butyl ester, 4-bromostilbene-4'-carboxylic acid i-propyl ester, 4-bromostilbene-4'-carboxylic acid i-butyl ester, 4-bromostilbene-4'-carboxylic acid tert.-butyl ester, 4-bromostilbene-4'-carboxylic acid n-pentyl ester, 4-bromo-4'-nitrostilbene, 4-acetoxy-4'-bromostilbene, 4-bromostilbene-4'-tetrahydropyranyl ether, 4-bromo-4'-iodostilbene, 4,4'-dibromostilbene, 4-bromo-4'-chlorostilbene, (4-bromostilbenyl-4')-methyl ketone, (4-bromostilbenyl-4')-ethyl ketone, (4-bromostilbenyl-4')-n-propyl ketone, (4-bromostilbenyl-4')-i-propyl ketone, (4-bromostilbenyl-4')-n-butyl ketone, 4-acetamino-4'-bromostilbene and 4-bromostilbene-4'-carbamic acid ethyl ester, preferably 4-bromobenzoic acid, 4-bromobenzoic acid methyl ester, 4-bromobenzoic acid ethyl ester, 4-bromobenzoic acid n-propyl ester, 4-bromobenzoic acid i-propyl ester, 4-bromobenzoic acid n-butyl ester, 4-bromobenzoic acid i-butyl ester, 4-bromobenzoic acid tert.-butyl ester, 4-bromonitrobenzene, 4-bromobenzaldehyde, 4-acetoxybromobenzene, 4-acetoxyiodobenzene, 4-bromophenyl tetrahydropyranyl ether, 4-iodophenyl tetrahydropyranyl ether, 1,4-dibromobenzene, 1-bromo-4-iodobenzene, 4-bromoacetophenone, (4-bromophenyl)ethyl ketone, (4-bromophenyl)-n-propyl ketone, 4-bromoacetanilide, 4-iodoacetanilide, 4-bromophenyl carbamic acid ethyl ester, 1-bromo-4-chlorobenzene, 4-bromobiphenyl-4'-carboxylic acid methyl ester, 4-bromobiphenyl-4'-carboxylic acid ethyl ester, 4-bromobiphenyl-4'-carboxylic acid n-propyl ester, 4-bromobiphenyl-4'-carboxylic acid i-propyl ester, 4-bromobiphenyl-4'-carboxylic acid n-butyl ester, 4-bromobiphenyl-4'-carboxylic acid i-butyl ester, 4-bromobiphenyl-4'-carboxylic acid tert.-butyl ester, 4-bromo-4'-nitrobiphenyl, 4-acetoxy-4'-bromobiphenyl, 4-bromo-4'-iodobiphenyl, 4,4'-dibromobiphenyl, 4-bromo-4'-chlorobiphenyl, (4-bromobiphenyl-4'-yl)-methyl ketone, (4-bromophenyl-4'-yl)-ethyl ketone, (4-bromobiphenyl-4'-yl)-n-propyl ketone, 4-bromobiphenyl-4'-carbamic acid ethyl ester, 4-bromostilbene-4'-carboxylic acid methyl ester, 4-bromostilbene-4'-carboxylic acid ethyl ester, 4-bromostilbene-4'-carboxylic acid n-propyl ester, 4-bromostilbene-4'-carboxylic acid n-butyl ester, 4-bromostilbene-4'-carboxylic acid i-propyl ester, 4-bromostilbene-4'-carboxylic acid i-butyl ester, 4-bromostilbene-4'-carboxylic acid tert.-butyl ester, 4-bromo-4'-nitrostilbene, 4-acetoxy-4'-bromostilbene, 4-bromostilbene-4'-tetrahydropyranyl ether, 4-bromo-4'-iodostilbene, 4,4'-dibromostilbene, 4-bromo-4'-chlorostilbene, (4-bromostilbenyl-4')-methyl ketone, (4-bromostilbenyl-4')-ethyl ketone, (4-bromostilbenyl-4')-n-propyl ketone and 4-bromostilbene-4'-carbamic acid ethyl ester. The following are particularly preferred: 4-Bromobenzoic acid, 4-bromobenzoic acid methyl ester, 4-bromobenzoic acid ethyl ester, 4-bromobenzoic acid n-butyl ester, 4-bromobenzoic acid tert.-butyl ester, 4-bromonitrobenzene, 4-acetoxybromophenol, 4-bromophenyl-tetrahydropyranyl ether, 4-iodophenyl-tetrahydropyranyl ether, 1,4-dibromobenzene, 1-bromo-4-iodobenzene, 4-bromoacetophenone, (4-bromophenyl)-ethyl ketone, 4-bromoacetanilide, 4-bromophenylcarbamic acid ethyl ester, 1-bromo-4-chlorobenzene, 4-bromobiphenyl-4'-carboxylic acid methyl ester, 4-bromobiphenyl-4'-carboxylic acid ethyl ester, 4-bromobiphenyl-4-carboxylic acid n-butyl ester, 4-bromobiphenyl-4'-carboxylic acid tert.-butyl ester, 4-bromo-4'-nitrobiphenyl, 4-acetoxy-4'-bromobiphenyl, 4-bromo-4'-iodobiphenyl, 4,4'-dibromobiphenyl, 4-bromo-4'-chlorobiphenyl, (4-bromobiphenyl-4'-yl)-methyl ketone, (4-bromobiphenyl-4'-yl)-ethyl ketone, (4-bromobiphenyl-4'-yl)-n-propyl ketone, 4-bromobiphenyl-4'-carbamic acid ethyl ester, 4-bromostilbene-4'-carboxylic acid ethyl ester, 4-bromostilbene-4-carboxylic acid n-propyl ester, 4-bromostilbene-4'-carboxylic acid tert.-butyl ester, 4-bromo-4'-nitrostilbene, 4-acetoxy-4'-bromostilbene, 4-bromostilbene-4'-tetrahydropyranyl ether, 4-bromo-4'-iodostilbene, 4,4'-dibromostilbene, 4-bromo-4'-chlorostilbene, (4-bromostilbenyl-4'-methyl ketone, (4-bromostilbenyl-4')-ethyl ketone, (4-bromostilbenyl-4')-n-propyl ketone and 4-bromostilbene-4'-carbamic acid ethyl ester.

Preferred compounds of formula (III) are those in which $R^5$ and $R^6$ stand for methyl or ethyl, e.g. 2-methyl-3-butyne-2-ol and trimethylsilylacetylene.

In the process according to the invention, about 0.8 to 1.2 mol, preferably 1.0 to 1.2 mol of compound (III) is used per mol of compound of formula (II). Suitable palladium catalysts are described e.g. in R. F. Heck, Palladium Reagents in Organic Syntheses, Academic Press, New York 1985, Chapter 6, Section 6.8.1). The following are examples of suitable palladium catalysts: $Pd(OAc)_2$, $PdCl_2(P\phi_3)_2$, $Pd(OAc)_2$, $Pd(P\phi_3)_4$ and/or $PdCl_2$, used in a quantity of about 0.005 to 10 mol-%, preferably 0.05 to 5 mol-%, based on the aryl halide of formula (II) ($\phi$ denotes phenyl).

The compound which is basic in reaction may be used in excess in order to bind the hydrogen halide released in the reaction. The compound which is basic in reaction may also be used as diluent. Suitable compounds which are basic in reaction include, for example, secondary and/or tertiary amines such as diethylamine, diisopropylamine, piperidine, triethylamine, pyridine and N,N'-diethylaniline, salts of carboxylic acids such as potassium acetate, alkali metal carbonates such as potassium carbonate, alkali metal bicarbonates such as sodium bicarbonate, alkali metal alcoholates such as sodium methanolate and sodium ethanolate and alkali metal hydrides such as sodium hydride.

Copper (I) iodide, for example, may be used as cocatalyst for the reaction of compound (II) with compound (III). This cocatalyst may be added in a quantity of about 10 to 1000 mol-%, based on the quantity of palladium used. The activity of the catalyst may be further improved by the addition of phosphanes. Preferred phosphanes are, for example, triphenylphosphane and tri-o-tolylphosphane. The quantity of phosphanes to be used may easily be determined by preliminary tests. They are generally used in a quantity of about 100 to 1000 mol-%, based on the palladium put into the process.

It is in some cases advantageous to carry out the reaction according to the invention of compounds of formula (II) with compounds of formula (III) in the presence of a solvent and/or diluent. The following are examples of suitable solvents and diluents: Aromatic hydrocarbons such as benzene, toluene or xylene, ethers such as tetrahydrofuran or dioxane, alcohols such as methanol or ethanol, acetonitrile, dimethylsulphoxide, dimethylformamide and N-methylpyrrolidone as well as amines such as diethylamine or triethylamine. The solvents and/or diluents may be used singly or as mixtures. The quantity may vary within a wide range and a suitable quantity may easily be determined by preliminary tests.

It is sometimes also advantageous to carry out the reaction in an inert gas atmosphere, e.g. a nitrogen atmosphere. This depends, for example, on the starting materials used.

The compounds of formula (IX) obtained by the reaction of compounds of formula (II) with compounds of formula (III) are converted into acetylenes of the general formula (IV) by a treatment with compounds which are basic in reaction, optionally in suitable solvents and/or diluents. In this reaction, the group $R^4$ of the compounds of formula (IX) is replaced by hydrogen. Methods for such reactions have been described, e.g. by V. Jäger in Houben-Weyl, Vol. V/2a, pages 405 and 649.

The compounds which are basic in reaction may be, for example, alkali metal hydroxides such as sodium hydroxide and/or potassium hydroxide, alkali metal carbonates such as sodium carbonate and/or potassium carbonate and alkali metal hydrides such as sodium hydride. The quantity of basically reacting compounds to be used may easily be determined by preliminary tests and is normally from 1 to 100 mol-%, preferably from 3 to 50 mol-%, based on the quantity of compound (IX) put into the process.

The following are examples of suitable solvents and/or diluents for the reaction described above: Aromatic hydrocarbons such as benzene, toluene or xylene, alcohols such as methanol or ethanol and mixtures of the above-mentioned solvents and/or diluents.

The reaction temperatures for the above-mentioned reaction depend to a large extent on the individual case. If the reaction is carried out in a solvent and/or diluent, the temperatures employed would generally be from −20° C. to the boiling point of the solvent and/or diluent or mixtures used.

If $R^4$ in formula (IX) stands for $C(CH_3)_2$—OH, the acetone formed in the above described reaction may be continuously distilled off. If $R^4$ in formula (IX) stands for $Si(CH_3)_3$, the protective group may also be replaced by hydrogen by means of a treatment with potassium fluoride dihydrate or potassium fluoride in a suitable solvent and/or diluent such as methanol, ethanol and/or dimethylformamide.

In the process according to the invention, the compounds of formula (IV) are reacted with compounds of formula (V) at temperatures from 30° to 160° C., preferably at 40° to 130° C., optionally in an inert gas atmosphere, in the presence of a palladium catalyst and a compound which is basic in reaction, optionally in the presence of a cocatalyst, optionally a phosphane, and optionally in the presence of a solvent and/or diluent. This reaction gives rise to diarylacetylenes corresponding to formula (X)

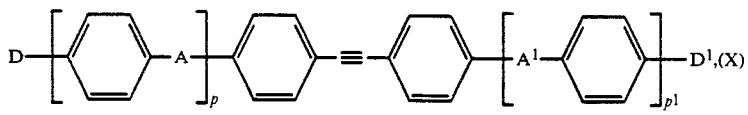

wherein D, D¹, A, A¹, p and p¹ have the meanings indicated above.

In the reaction of compounds of formula (IV) with the aromatic halides of formula (V) to form the diarylacetylenes of formula (X), from 0.7 to 1.3 mol, preferably from 0.8 to 1.2 mol of the compound of formula (IV) is generally used per mol of compound (V).

In the process according to the invention the compounds of formula (IV) may also be reacted with aromatic dihalides corresponding to the general formula (VIII)

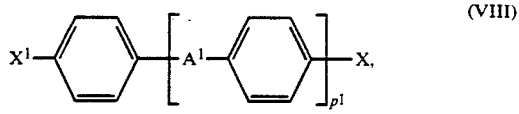

wherein X¹ and X and A¹ and p¹ have the meanings indicated above to form diacetylene compounds corresponding to formula (XI)

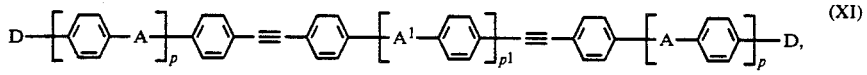

wherein D, A, A¹, p and p¹ have the meanings indicated above.

In that case, the compound of formula (IV) is generally used in a quantity of about 2.0 to 2.6 mol, preferably 2.0 to 2.2 mol, per mol of the compound of formula (VIII).

The reaction is again carried out at temperatures from 30° to 160° C. in the presence of a palladium catalyst and a compound which is basic in reaction, as described above.

The following are examples of preferred compounds of formula (VIII): 1,4-Diiodobenzene, 1-bromo-4-iodobenzene, 1,4-dibromobenzene, 4,4'-diiodobiphenyl, 4-bromo-4'-iodobiphenyl, 4,4'-dibromobiphenyl, 4,4'-diiodostilbene, 4-bromo-4'-iodostilbene and 4,4'-dibromostilbene, the following being particularly preferred: 1,4-dibromobenzene, 4,4'-dibromobiphenyl and 4,4'-dibromostilbene.

As regards the palladium catalyst, the base, the cocatalyst and the addition of phosphane and diluent or solvent, the same applies as already described for the reaction of compounds of formula (II) with compounds of formula (III).

The acetylenes of formula (X) obtained from the reaction and the diacetylenes of formula (XI) obtained are then reduced to the corresponding Z-stilbene compounds by means of hydrogen or other suitable reducing agents in the presence of catalysts. These Z-stilbene compounds are compounds corresponding to formula (VI):

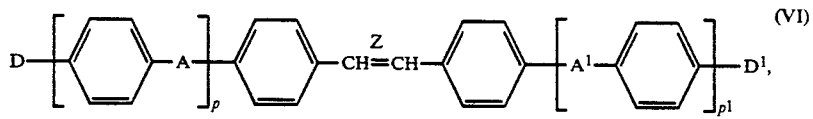

wherein D, A, A¹, p and p¹ have the meanings already indicated and compounds corresponding to formula (XII)

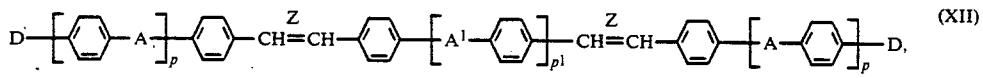

wherein D, A, A¹, p and p¹ have the meanings already indicated.

The following are examples of suitable reduction processes: Hydrogenation in the presence of hydrogenation catalysts such as special palladium or nickel catalysts which have been described, for example, by H. Balli in Houben-Weyl, Vol. V/1b, pages 588 et seq; by H. Gutmann and H. Lindlar in Chemistry of Acetylenes, H. G. Viehe Ed., Marcel Dekker, New York 1969, pages 355 et seq; and by J. J. Brunet and P. Caubere in J. Org. Chem. 49, 4058 (1984); reduction with systems of metal and agents which split off protons, such as the reduction with zinc or zinc/copper pairs in acetic acid, alcohol or water (described e.g. by H. Balli in Houben-Weyl, Vol. V/1b, page 583; by B. L. Sondengam, G. Charles, and T. H. Akam, in Tetrahedron Lett. 1069 (1980); and by M. H. P. J. Aerssens, and L. Brandsma in J. Chem. Soc. Chem. Commun. 735 (1984); the conversion of acetylenes into vinyl silanes followed by stereoselective exchange of the silyl group for hydrogen (see e.g. D. G. Batt, and B. Ganem, in Tetrahedron Lett. 3323 (1978)) and the monohydroborination of acetylenes followed by protolysis, reduction with dialkyl aluminium hydrides or reduction with diimine (see H. Balli in Houben-Weyl, Vol. V/1b, pages 583 et seq).

According to H. Balli, special palladium catalysts are colloidal palladium or palladium with additional metal such as silver, magnesium rhodium or mercury, lead. The hydrogenation takes place in the gas-phase or liquid-phase, usually at normal pressure in a temperature range from 0° to 300° C. using hydrogen. Glacial acetic acid, ethanol, acetic acid ester may be used as solvents. Suitable nickel catalysts are raney-nickel or desactivated nickel, especially used for the hydrogenation in the liquid phase. According to Gutmann et al., the most frequently used catalyst is palladium, usually on suitable carriers, and then nickel. For preparative purposes, these catalysts are modified with salts of heavy metals such as lead, zinc, copper and/or poisoned by addition of organic or inorganic bases or of organic sulfides. Raney nickel may also be used. Hydrogenation in the liquid phase is usually carried out in a solvent such as e.g. ether, toluene, lower aklanols.

When D and $D^1$ stand for at least one bromine atom, the compounds of formula (VI) may be reacted by the process according to the invention with compounds of formula (VII) in the presence of a palladium catalyst and a compound which is basic in reaction, optionally in the presence of a cocatalyst, optionally in the presence of a phosphane and optionally in the presence of a solvent and/or diluent at temperatures from 30° to 160° C., preferably at 40° to 130° C., optionally in an inert gas atmosphere, to produce compounds corresponding to the general formulae (XIII), (XIV) and (XV) in which D, A, p, $A^1$, $p^1$ and $D^1$ and $D^2$ have the meanings already indicated:

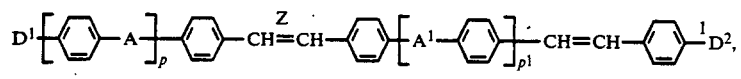

(XIII)

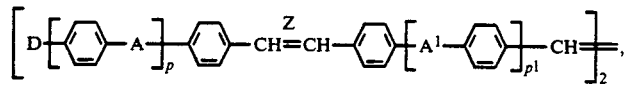

(XIV)

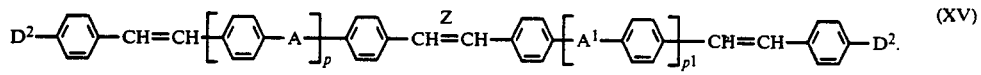

(XV)

The reaction of aromatic halides, in particular aromatic bromides and iodides, with ethylene or ethylene derivatives is a known reaction (see e.g. R. F. Heck, Org. React. 27, 345 (1982)) and is carried out in the present invention by the conventional method.

The compounds corresponding to formula (VII) are well known compounds of organic chemistry or may easily be prepared by analogous processes (see e.g. W. Heitz et al, Makromol. Chem. 189, 119 (1988)). According to Heitz et al., the compounds of the formula VII may be prepared e.g. by reaction of bromophenyl derivatives with ethylene. The reaction is catalyzed by palladium.

The following are examples of preferred compounds corresponding to formula (VII): 4-Carboxystyrene, 4-carbomethoxystyrene, 4-carboethoxystyrene, 4-carbo-n-propoxystyrene, 4-carbo-i-propoxystyrene, 4-carbo-n-butoxystyrene, 4-carbo-i-butoxystyrene, 4-carbo-tert.-butoxystyrene, 4-acetaminostyrene, 4-acetoxystyrene, 4-nitrostyrene, (styryl-4)methyl ketone, (styryl-4)ethyl ketone, (styryl-4)-n-propyl ketone, (styryl-4)-i-propyl ketone, (styryl-4)-n-butyl ketone, 4-chlorostyrene and 4-aminostyrene.

As a final step of the process according to the invention, the resulting Z-stilbene compounds containing the functional groups D, $D^1$ and $D^2$ are converted by basically known methods into the bifunctional stilbene compounds of formula (I) claimed according to the invention, which contain the functional groups Y and Z and have at least one Z-configurated stilbene group.

The conversion of the functional groups may be carried out, for example, by acid or alkaline hydrolysis of esters to the corresponding acids, by proton catalysed decomposition of tert.-butyl esters into free carboxylic acids and isobutene, by conversion of carboxylic acids into their chlorides, e.g. by a reaction with thionyl chloride or oxalyl chloride, optionally in the presence of catalytic quantities of DMF or pyridine, by the oxidation of aryl ketones to the corresponding aryl carboxylic acids, by the reduction of nitro groups to amino groups, by the conversion of amino or carboxyl groups into isocyanate groups or by the reaction of hydroxyl groups into the corresponding chlorocarbonic acid esters. These methods are well known and have been described e.g. in "Organikum", by a group of co-authors, VEB Deutscher Verlag der Wissenschaften, Berlin 1976; J. March, Advanced Organic Chemistry, Wiley, 3rd Ed. 1985; and C. Ferri, Reactionen der organischen Synthese, Stuttgart, Thieme 1978.

The process according to the invention may be represented by the following scheme of formulae which illustrates by way of example the synthesis of Z-1-(4-carboxyphenyl)-2-(4'-carboxybiphenyl-4-yl)ethene:

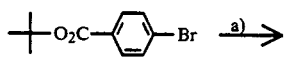

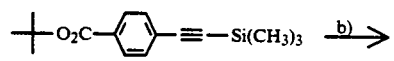

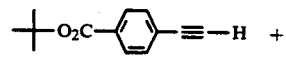

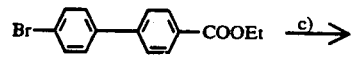

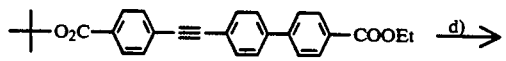

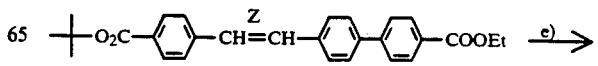

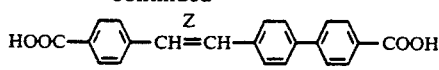

7 a) H—≡—Si(CH$_3$)$_3$, ($\phi_3$P)$_2$PdCl$_2$, CuI, $\phi_3$P, CH$_3$CN, NEt$_3$
b) K$_2$CO$_3$, CH$_3$OH
c) ($\phi_3$P)$_2$PdCl$_2$, CuI, $\phi_3$P, CH$_3$CN, NEt$_3$
d) Zn/Cu, C$_2$H$_5$OH, THF
e) 1. p—TsOH, Toluol, 2. NaOH, H$_2$O, C$_2$H$_5$OH 3. HCl Reactions e) 2. and 3. serve merely to purify the reaction product.

In one variation of the process according to the invention, aryl halides of formula (II) can be directly converted into the corresponding diarylacetylenes of formula (X) in which D=D$^1$, A=A$^1$ and p=p$^1$ and the symbols have the meanings already given for formula (X) by reacting the aryl halides of formula (II) with acetylenes of formula (III) in the presence of a palladium catalyst and a base, optionally in the presence of a cocatalyst, a phosphane, a solvent and/or diluent and a phase transfer catalyst at temperatures from 40° C. to 170° C., preferably at 60° C. to 130° C.

The aryl halides of formula (II) are preferably of the type given in the above list of aryl halides of formula (II).

The acetyl compound of formula (III) is preferably 2-methyl-3-butyn-2-ol.

In this variation, from 0.8 to 1.2 mol, preferably from 0.9 to 1.1 mol of acetylene of formula (III) are generally used for 2 mol of the aryl halide of formula (II). The palladium catalysts used are those already previously mentioned.

The reaction according to this variation is carried out in the presence of a compound which is basic in reaction. Examples of suitable compounds which are basic in reaction include alkali metal hydroxides such as sodium hydroxide and potassium hydroxide, alkali metal alcoholates such as sodium ethanolate and sodium methanolate, alkali metal hydrides such as sodium hydride, alkali metal amides such as sodamide, alkali metal carbonates such as sodium carbonate and potassium carbonate, alkali metal bicarbonates such as sodium bicarbonate and potassium bicarbonate, and mixtures of these compounds with one another. The reaction according to this variation may also be carried out in the presence of an aqueous solution of the above mentioned compounds which are basic in reaction. A co-catalyst may be used to accelerate the reaction. The co-catalysts already mentioned above are suitable for this purpose. Phosphanes may also be used for the reaction according to this variation. Suitable phosgenes have already been described above.

The reaction may be carried out in the presence of a solvent and/or diluent if necessary. Examples of suitable solvents and/or diluents include aromatic hydrocarbons such as benzene, toluene and/or xylene, amides such as dimethylformamide and/or NMP and/or sulphoxides such as dimethylsulphoxide and alcohols such as methanol and/or ethanol.

A phase transfer catalyst for the reaction of compounds of formula (II) with compounds of formula (III) may also be used in this variation. Suitable phase transfer catalysts are described, for example, by E. V. Dehmlow, and S. S. Dehmlow in Phase Transfer Catalysis, 2nd Edition, Verlag Chemie, Deerfield Beach, Fla., 1983. The following are suitable examples: Tetraethylammonium chloride monohydrate, tetraethylammonium bromide, tetraethylammonium iodide, tetraethylammonium tetrafluoroborate, tetraethylammonium-p-toluene sulphonate, allyl triethylammonium bromide, n-hexyl-trimethylammonium bromide, phenyl triethylammonium chloride, phenyltrimethylammonium iodide, benzyl trimethylammonium bromide, benzyl trimethylammonium iodide, n-octyl-trimethylammonium bromide, tetra-n-propyl-ammonium bromide, tetra-n-propylammonium hydrogen sulphate, tetra-n-propylammonium trifluoromethanesulphonate, benzyl triethylammonium chloride, benzyl triethylammonium bromide, benzyl triethylammonium tetrafluoroborate, n-dodecyl trimethylammonium bromide, tetra-n-butylammonium chloride, tetra-n-butylammonium bromide, tetra-n-butylammonium iodide, tetra-n-butylammonium hydrogen sulphate, tetra-n-butylphosphonium bromide, tetraphenylphosphonium chloride, tetraphenylphosphonium bromide, tetraphenylphosphonium iodide, tetraphenylphosphonium hexafluoroantimonate, tetraphenylphosphonium tetrafluoroborate, N-hexadecylpyridinium bromide, tetra-n-hexylammonium bromide, tetra-n-hexylammonium hydrogen sulphate, n-hexadecyl-tri-n-butylphosphonium bromide, triphenylmethyl-triphenyl-phosphonium chloride, tetra-n-octylammonium bromide and tetra-n-dodecylammonium iodide.

It may be advantageous to carry out the reaction in an inert gas atmosphere, e.g. a nitrogen atmosphere.

In this variation, the reaction is generally carried out by introducing the aryl halide of formula (II), the acetylene of formula (III), the palladium catalyst, optionally the cocatalyst, the phosphane and the phase transfer catalyst into the reaction vessel, optionally in a suitable solvent and/or diluent, adding the compound which is basic in reaction and heating the reaction mixture to a sufficiently high temperature for the reaction. The components for the reaction may, of course, also be added in a different sequence. The acetylene of formula (III), optionally dissolved in one of the above-mentioned solvents and/or diluents, may be added dropwise to the other reactants at the reaction temperature within a suitable period of time, i.e. within about 0.5 to 24 hours. The progress of the reaction may be followed, for example, gas chromatographically. For working up the reaction product, the phases are generally separated and the reaction product is isolated by conventional methods. The reaction product in some cases already precipitates during the reaction or on cooling after termination of the reaction, in which case it is separated by suction filtration and the liquid phases are worked up by the usual methods. The reaction product may be purified by crystallisation, distillation or chromatography.

The reaction sequence of the process carried out according to this variation may be represented by the following scheme of formulae which illustrates by way of example the synthesis of Z-4,4'-stilbene dicarboxylic acid dichloride:

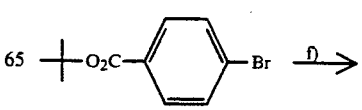

1

-continued

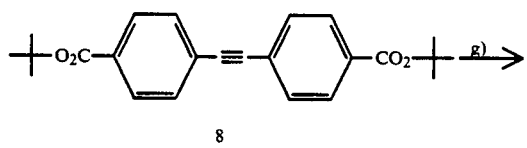

8

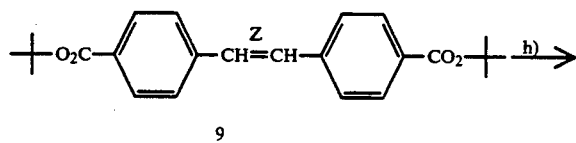

9

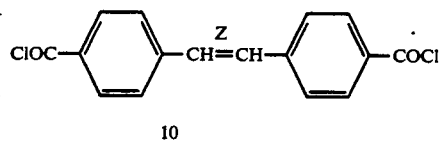

10 f) 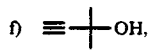

($\phi_3$P)$_2$PdCl$_2$, CuI, P$\phi_3$, NaOH, H$_2$O, Toluene, BzNEt$_3$Cl
g) Zn/Cu, EtOH/THF
h) 1. p-TsOH, Toluene 2. NaOH, H$_2$O, EtOH 3. HCl 4. SOCl$_2$. DMF Steps h) 2. and 3. shown here serve merely for further purification of the reaction product.

According to another variation, compounds of formula (X) in which D≠D$^1$ and/or A≠A$^1$ and/or p≠p$^1$ may be prepared by the reaction of compounds of the general formula (IX) with aryl halides of the general formula (V) in the presence of a palladium catalyst and/or a compound which is basic in reaction, optionally in the presence of a cocatalyst, a phosphane, a solvent and/or diluent and a phase transfer catalyst at temperatures from 40° to 170° C., preferably at 60° to 130° C.

Preferred compounds of the formula (IX) are those in which R$^4$ is C(CH$_3$)$_2$—OH or Si(CH$_3$)CH$_3$.

Preferred compounds of formula (V) are those already mentioned in connection with formula (II).

As regards the palladium catalyst, the cocatalyst, the base, the diluent and/or solvent and the addition of phosphane and phase transfer catalyst, the same applies as has already been described for the above mentioned variation.

The quantity of aryl halide corresponding to formula (V) used is generally from 0.8 to 1.2 mol, preferably from 0.9 to 1.1 mol, per mol of the acetylene corresponding to formula (IX). The reaction of the compounds of formula (IX) with those of formula (V) may take place in the same manner as in the variation previously described.

This variation is therefore illustrated below by way of example for the synthesis of Z,E-1,4-bis-(4-carboxystyryl)-benzene:

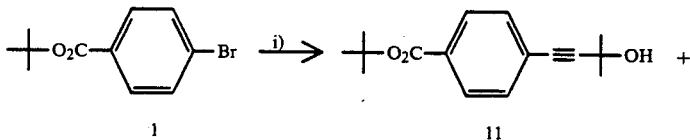

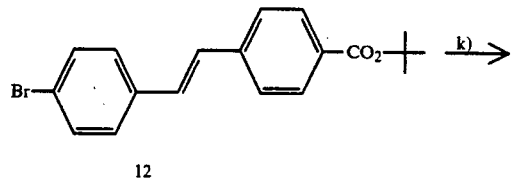

12

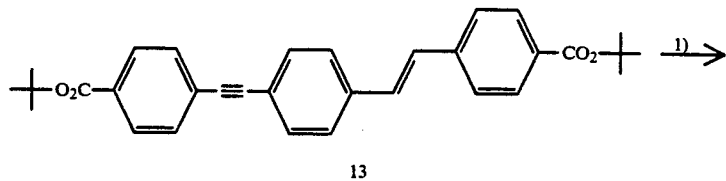

13

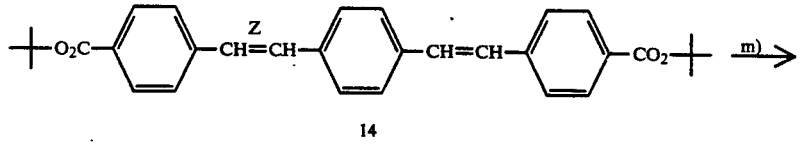

14

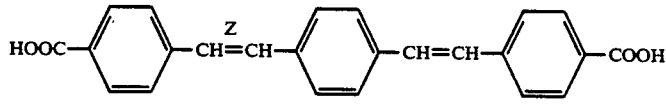

15

(Pφ3)2PdCl2, CuI, NEt3, Pφ3, CH3CN k) (φ3P)2PdCl2, CuI, Pφ3, NaOH, H2O, Toluene, BzNEt3Cl l) Zn/Cu EtOH/THF m) 1. p-TsOH, Toluene 2. NaOH, H2O, EtOH 3. HCl The reactions m) 2. and 3. serve to purify the reaction product.

Polyesters, polyester carbonates, polycarbonates or polyamides containing at least one Z-configured stilbene group are preferably produced by the process according to the invention.

To produce polyesters by the process according to the invention, stilbene compounds corresponding to formula (I), in which Z and Y=COOH, COCl, COOR with R=$C_{1-8}$ alkyl, are reacted with dihydroxy compounds corresponding to formula (II)

HO—Ar—(X)$_o$—(Ar)$_p$—OH      (II), in which

Ar represents $C_{6-18}$ aromatic radicals which may optionally be substituted by halogen (F, Cl, Br), $C_{1-4}$ alkyl, $C_{1-4}$ alkoxy, $C_{6-10}$ aryl or $C_{6-10}$ aryloxy radicals, X represents —CO—, —SO2—, —S—, —CH2—, —C(CH3)2—, an alkylene or alkylidene radical containing 2 to 20 and preferably 2 to 4 carbon atoms and o and p=0 or 1.

Preferred dihydroxy compounds corresponding to formula (II) are hydroquinone, resorcinol, 4,4'-dihydroxydiphenyl, 4,4'-dihydroxydiphenyl ether, 4,4'-dihydroxydiphenyl sulfide, 4,4'-dihydroxydiphenyl sulfone, 4,4'-dihydroxydiphenyl ketone, bis-2,2-(4-hydroxyphenyl)-propane, bis-(4-hydroxyphenyl)-methane and also 1,4-, 1,5-, 2,7- or 2,6-dihydroxynaphthalene. Up to 90 mol-% and preferably from 10 to 50 mol-% of the dicarboxy-functional stilbene compounds may be replaced by other aromatic dicarboxylic acids, such as isophthalic acid, terephthalic acid, 4,4'-biphenyl dicarboxylic acid and/or 2,6-naphthalene dicarboxylic acid or by carbonate structures.

Conversely, polyesters may also be produced by reaction of stilbene compounds corresponding to formula (I), with Z and Y=OH, with aromatic dicarboxylic acids in the process according to the invention. Preferred dicarboxylic acids are isophthalic acid, terephthalic acid, terphenyl dicarboxylic acid, tolane dicarboxylic acid, 4,4'- or 3,4'-benzophenone dicarboxylic acid, 4,4'- or 3,4'-diphenyl ether dicarboxylic acid, 1,4-, 1,5-, 2,7- and/or 2,6-naphthalene dicarboxylic acid. Where carbonic acid derivatives, such as phosgene or diphenyl carbonate, are used, polycarbonates or polyester carbonates having corresponding properties may be obtained. Up to 90 mol-% and preferably from 10 to 50 mol-% of the dihydroxy-functional stilbene compounds may be replaced by other aromatic dihydroxy compounds, such as 2,2-bis-(4-hydroxy-phenyl)-propane, hydroquinone and/or 4,4'-dihydroxy-diphenyl.

In the process according to the invention, polyamides may be produced by reaction of stilbene compounds corresponding to formula (I), in which Z and Y represent COOH, COCl, COOR, with R=$C_{1-8}$ alkyl, with diamino compounds corresponding to formulae (III) and/or (IV)

H2N—Ar—(X)$_o$—(Ar)$_p$—NH2      (III)

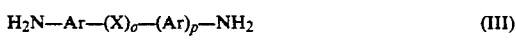

H2N—Alk—NH2      (IV)

in which

Ar represents $C_{6-18}$ aromatic radicals optionally substituted by halogen (fluorine, chlorine, bromine), $C_{1-4}$ alkyl, $C_{1-4}$ alkoxy, $C_{6-10}$ aryl or $C_{6-10}$ aryloxy radicals, X represents —CO—, —SO2—, —S—, —CH2—, —C(CH3)2—, an alkylene or alkylidene radical containing 2 to 20 and preferably 2 to 4 carbon atoms, o and p=0 or 1 and Alk is a $C_{2-40}$ and preferably $C_{2-20}$ alkylene or alkylidene radical, such as ethylene, 1,3-propylene, 1,4-butylene, 1,5-pentamethylene, 1,6-hexamethylene, 1,7-heptamethylene, 1,8-octamethylene, 1,10-decamethylene, 1,12-dodecamethylene, 1,2-propylene, 1,1-propylidene, 2,2-butylidene, 2,2-pentamethylidene, 3,3-pentamethylidene.

Preferred diamino compounds corresponding to formula (III) are 1,4-diaminobenzene, 1,3-diaminobenzene, 1,2-diaminobenzene, 4,4'-diaminobiphenyl, 4,4'-diaminoterphenyl, 1,4-, 1,5-, 2,6- or 2,7-diaminonaphthalene, 2,6-diaminoanthraquinone, 4,4'-diaminodiphenyl methane, 3,4'-diaminodiphenyl methane, 2,4'-diaminodiphenyl methane, 3,3'-diaminodiphenyl methane, 2,2'-diaminodiphenyl methane, 4,4'-diaminodiphenyl ether, 3,4'-diaminodiphenyl ether, 3,3'-diaminodiphenyl ether, 4,4'-diaminodiphenyl sulfide, 3,4'-diaminodiphenyl sulfone, 4,4'-diaminodiphenyl ketone, 3,4'-diaminodiphenyl ketone, 2,2-bis-(4-aminophenyl)-propane or 1,2-bis-(4-aminophenyl)-ethane. It is particularly preferred to use 1,4-diaminobenzene, 1,3-diaminobenzene or 4,4'- or 3,4'-diaminodiphenyl ether.

Preferred diamino compounds corresponding to formula (IV) are 1,2-diaminoethane, 1,3-diaminopropane, 1,4-diaminobutane, 1,5-diaminopentane, 1,6-diaminohexane, 1,7-diaminoheptane, 1,8-diaminooctane, 1,10-diaminodecane, 1,12-diaminododecane, 1,18-diaminooctadecane, 1,4-diaminocyclohexane, 1,2-diaminopropane or 2,2-diaminopropane. 1,6-Diaminohexane and 1,12-diaminododecane are particularly preferred.

Up to 90 mol-% and preferably from 10 to 50 mol-% of the dicarboxy-functional stilbene compounds may optionally be replaced by other aromatic dicarboxylic acids, such as terephthalic acid, isophthalic acid, 4,4'-biphenyl dicarboxylic acid, 2,6-naphthalene dicarboxylic acid or by carbonate structures.

Conversely, polyamides may also be prepared by reaction of stilbene compounds corresponding to formula (I), in which Z and Y=NH2 or NHCH3, with aromatic dicarboxylic acids in the process according to the invention. Preferred dicarboxylic acids are isophthalic acid, terephthalic acid, terphenyl dicarboxylic acid, tolane dicarboxylic acid, 4,4'- or 3,4'-benzophenone dicarboxylic acid, 3,4'- or 4,4'-diphenyl ether dicarboxylic acid and also 1,4-, 1,5-, 2,7- or 2,6-naphthalene dicarboxylic acid. Up to 90 mol-% and preferably from 10 to 50 mol-% of the diamino functional stilbene compounds may optionally be replaced by other aromatic diamino compounds, such as 1,4-diaminobenzene, 1,3-diaminobenzene, 4,4'-diaminodiphenyl methane and/or 4,4'-diaminodiphenyl ether.

Branching trifunctional or higher monomers may also be used in quantities of from about 0.1 to 1.0%, based on the quantity of stilbene units (I), in the production of the polymers according to the invention. Suitable branching agents should preferably contain the same functional groups as the stilbene compounds (I) used or the bifunctional monomers used. The preferred branching agent in the production of polyesters and polyamides is 1,3,5-benzene tricarboxylic acid.

It is also possible to use monofunctional compounds as chain terminators in the production of low-melting polymers by the process according to the invention. The chain terminators may be used in quantities of from about 0.5 to 5 mol-%, based on the quantity of stilbene units (I). Suitable chain terminators should preferably contain the same functional groups as the stilbene compound (I) used or the bifunctional monomers used. Preferred chain terminators in the production of polyesters and polyamides are benzoic acid, 4-biphenyl carboxylic acid, naphthalene-2-carboxylic acid, phenol, p-tert.-butyl phenol, p-isooctyl phenol, β-naphthol, aminobenzene, 4-aminobiphenyl and/or 2-aminonaphthalene.

The number average molecular weights of polymers produced by the process according to the invention is in the range from 1,000 to 100,000 g/mol and preferably in the range from 5,000 to 50,000 g/mol. The molecular weights may be measured, for example, by gel permeation chromatography (GPC) in suitable solvents, such as dichloromethane, chloroform, tetrahydrofuran or dimethyl formamide.

One preferred embodiment of the process according to the invention in the case of polyesters, polycarbonates, polyester carbonates or polyamides is solution polycondensation. In this embodiment, activated dicarboxylic acid derivatives, such as dicarboxylic acid dichlorides, are reacted with diamines or dihydroxy compounds in organic solvents which are capable of solvating both the starting compounds and the polymers formed. Examples of suitable solvents of this type are pyridine, dichloromethane, chloroform, chlorobenzene, tetrahydrofuran, dimethyl formamide, dimethyl acetamide and/or N-methyl pyrrolidone. In the synthesis of polyamides, the solubility of the polymer may be increased by addition of certain salts, such as LiCl and/or $CaCl_2$. The total concentration of the corresponding polymers is in the range from about 0.5 to 30% by weight and preferably in the range from 5 to 20% by weight. Cleavage products, such as HCl, formed during the polycondensation may either be removed in gaseous form from the reaction mixture or may be chemically bound, i.e. for example by pyridine or other bases.

The reaction is preferably carried out at temperatures in the range from − 10° C. to 100° C. and, more preferably, at temperatures in the range from 0° to 30° C. The reaction time is normally from 5 to 180 minutes and preferably from 10 to 60 minutes.

The molar ratio of the dicarboxylic acid derivatives used to the diamines or dihydroxy compounds used is approximately 1.0:0.9-1.2 and preferably 1.0:1.0. Further information on the conduct of solution polycondensation reactions can be found, for example, in Odian "Principles of Polymerization", 2nd Edition, John Wiley and Sons, New York 1981.

Another embodiment of the process according to the invention in the case of polyesters, polycarbonates, polycarbonates and polyamides is interfacial polycondensation. In this embodiment, activated dicarboxylic acid derivatives, such as dicarboxylic acid dichlorides, are reacted with dihydroxy compounds in a two-phase system consisting of an organic phase and an alkaline-aqueous phase. The organic phase may be formed by solvents which solvate both the activated dicarboxylic acid derivatives and the polymers formed and which are not miscible with water. Suitable solvents are, for example, dichloromethane, chloroform and/or chlorobenzene. The aqueous phase is adjusted to a pH value of from about 8 to 14 by the addition of inorganic bases, such as NaOH and/or KOH; the pH value is preferably in the range from 9 to 13. The ratio by volume of the organic phase to the aqueous phase may be from 5:1 to 1:5 and is preferably from 1.5:1 to 1:1.5. The concentration of the polymers formed, based on the organic phase, should be from 0.5 to 30% by weight and preferably from 5 to 20% by weight.

To increase the reaction velocity, catalysts may be used in quantities of from about 0.1 to 10 mol-%, based on the quantity of dihydroxy compound used. Suitable catalysts are tertiary amines, such as triethyl amine, N-ethyl piperidine, and/or quaternary ammonium salts, such as tetraethyl ammonium bromide, tetrabutyl ammonium bromide and/or triethyl benzyl ammonium bromide. The reaction is preferably carried out at temperatures in the range from 5 to 95° C. and more preferably at temperatures in the range from 5° to 30° C. The reaction time should be from 5 to 180 minutes and preferably from 10 to 60 minutes. The molar ratio of the dicarboxylic acid derivatives used to the dihydroxy compounds used is normally 1.0:0.9-1.5 and preferably 1.0:1.0. Further information on the conduct on interfacial polycondensation reactions can be found, for example, in Odian "Principles of Polymerization", 2nd Edition, John Wiley and Sons, New York 1981.

The low-melting polymers containing at least one Z-configured stilbene group produced by the process according to the invention may be processed either in the melt or from solution. In melt processing, the solvent added in the process according to the invention is first removed and the polymer subsequently processed at temperatures of up to 250° C. In this way, moldings can be produced by injection molding or transfer molding while fibers, filaments, films, sheets or profiles can be produced by extrusion. Processing from solution comprises forming with subsequent solidification of the polymer in precipitation baths or by evaporation of the solvent. In this way, fibers, filaments or films can be produced by extrusion in precipitation baths and may subsequently be freed from residues of solvent by washing and drying. Suitable precipitation baths contain, for example, methanol, isopropanol or other suitable alcohols, optionally in admixture with water. Films or coatings may be obtained by spreading the polymer solution over a substrate and then evaporating the solvent. The polymers produced by the process according to the invention are preferably processed from solution. The polymers produced by the process according to the invention processed in this way may be converted into high-melting, highly heat-resistant plastic articles of the type described above by conversion of the Z-configured stilbene units present in the polymers into the E-configuration.

The Z-configuration of the stilbene units present in the polymers may be converted into the E-configuration at temperatures in the range from about 250° to 500° C. and preferably at temperatures in the range from 300° to 400° C. and/or by irradiation at wavelengths in the range from 200 to 800 nm and preferably in the range from 250 to 400 nm. The configuration of the stilbene units in the polymer is preferably converted by the thermal method.

To this end, the moldings resulting from processing are exposed to a temperature in the range from 250° to 500° C. for a period of $10^0$ to $10^5$ seconds. The thermal conversion is preferably carried out at temperatures of 300° to 400° C. over a period of $10^1$ to $10^3$ seconds. Observations with a differential scanning calorimeter show that the conversion process is accompanied by a considerable negative heat effect.

- In another embodiment, the conversion is obtained by irradiation of corresponding fibers, films, filaments or coatings. The irradiation may be carried out with monochromatic or polychromatic light in the wavelength range from 200 to 800 nm. The irradiation is preferably carried out with polychromatic light in the wavelength range from 250 to 400 nm. In addition, irradiation is preferably carried out at temperatures above the glass transition temperature of the corresponding polymers.

As already mentioned, the polymers containing at least one Z-configured stilbene group obtained by the process according to the invention are particularly suitable by virtue of their ready processibility for the production of moldings, fibers, filaments, films and coatings which, after suitable heat treatment and/or irradiation, may be converted into articles of particularly high resistance to heat and chemicals. The articles thus produced are used predominantly in the electrical and electronics field, in transport or in chemical plant construction.

The polymers produced by the process according to the invention may also be mixed with other thermoplastics, such as polystyrene, polyethylene, polypropylene, polyvinyl chloride, polyesters, polyamides, polycarbonates, polyacetals, aromatic polyethers, polysulfones, poly-(p-phenylene sulfides), polyether ketones and/or liquid crystalline polyesters, by compounding in solution or in the melt. Preferred mixtures are those containing about 1 to 50% by weight of the polymers produced by the process according to the invention.

Reinforcing materials or fillers, such as glass, carbon or aramide fibers, mica, talcum, carbon black, graphite and/or fused silica may be added to the polymers produced in accordance with the invention in the usual way in quantities of from about 5 to 65% by weight and preferably in quantities of from 10 to 40% by weight.

The process according to the invention is illustrated by the following Examples.

EXAMPLE 1

Preparation of a polyester from cis-stilbenedicarboxylic acid dichloride/4,4'-dihydroxydiphenyl ether and subsequent isomerization to the high-melting all-trans-polyester The following substances were weighed under nitrogen into a 1,000 ml wave-breaker flask equipped with a KPG stirrer, nitrogen inlet and reflux condenser:

| | | |
|---|---|---|
| 8.16 g = 0.0404 mol | 4,4'-dihydroxydiphenyl ether | |
| 7.20 g = 0.0812 mol | conc. sodium hydroxide (45%) | |
| 400 ml | distilled water | |
| 160 ml | dichloromethane (unstabilized) | |
| 0.14 g | tetrabutylammonium bromide (1 mol %) | |

All the reactants were dissolved in 20 minutes by stirring at room temperature. A solution—prepared in the strict absence of moisture—of

| | | |
|---|---|---|
| 12.2 g = 0.0400 mol | cis-4,4'-stilbenedicarboxylic acid dichloride in | |
| 60 ml | dichloromethane (unstabilized) | | was then added with rapid stirring, followed by stirring for 30 minutes at room temperature (20° C.). For working up, the organic phase was separated off, acidified with acetic acid, washed with distilled water until free from electrolyte, concentrated at room temperature and the residue obtained dried overnight at room temperature in a vacuum drying cabinet.

15.77 g of a transparent, colorless product having a relative solution viscosity of 1.61 (dichloromethane, 25° C., c=0.5 g/dl) were obtained. Transparent, tough films could be cast from solutions in dichloromethane. Examination with a hot-stage microscope revealed a softening temperature of 200° C.

For conversion into the highly heat-resistant all-trans form, 1 g of polymer was heated for 30 minutes to a temperature of 300° C. Clouding and shrinkage were observed. After heating, examination with a hot-stage microscope revealed no softening or melting up to the upper limit of the adjustable temperature range of 400° C.

A glass transition temperature of 144° C. is observed in characterization of the unheated reaction product by differential thermoanalysis (DSC). On continued heating, there is a highly exothermic transition ($\Delta H = -73$ J/g) with a peak maximum at 353° C. which may be attributed to isomerization or crystallization processes. In a second heating, there is no glass or melt transition up to a temperature of 400° C.

COMPARISON EXAMPLE

Preparation of a polyester from cis-stilbenedicarboxylic acid/4,4'-dihydroxydiphenyl ether by melt condensation A melt polycondensation reactor consisting of a 100 ml round-bottomed flask, condensation attachment, KPG stirrer and nitrogen inlet was heated and purged with nitrogen three times. The following substances were weighed in under nitrogen:

| | |
|---|---|
| 5.06 g = 0.025 mol | 4,4'-dihydroxydiphenyl ether |
| 6.71 g = 0.025 mol | cis-4,4'-stilbenedicarboxylic acid |
| 5.36 g = 0.0525 mol | acetanhydride |
| 15 g | acetic acid |
| 1 mg | magnesium acetate |

The reaction mixture was heated by oil bath to 170° C., after which the temperature was increased in several stages to 270° C. over a period of 3 hours, most of the acetic acid distilling off. By further increasing the temperature to 300° C., the viscosity of the dark-brown melt gradually increased, the reaction mixture becoming solid after 30 minutes. Finally, to complete the elimination of acetic acid, the pressure was lowered to 0.8 mbar in several steps over a period of 45 minutes (quantity of distillate: 19.5 g). A brittle, brown powder was obtained after cooling and did not soften up to 350° C. on examination with a hot-stage microscope. The product was insoluble in dichloromethane. In characterization by differential thermoanalysis (DSC), no glass transition or melting temperature was observed in a first heating up to 400° C. The reaction product could not be processed either from solution or from the melt.

EXAMPLE 2

Preparation of a polyester from cis-stilbenedicarboxylic acid dichloride/bisphenol A by the interfacial process The following substances were weighed under nitrogen into a 250 ml wave-breaker flask equipped with a KPG stirrer, nitrogen inlet and reflux condenser:

| | |
|---|---|
| 4.61 g = 0.0202 mol | 2,2-bis-(4-hydroxyphenyl)-propane (bisphenol A) |
| 3.60 g = 0.0406 mol | conc. sodium hydroxide (45%) |
| 65 ml | distilled water |
| 30 ml | dichloromethane (unstabilized) |
| 70 mg | tetrabutylammonium bromide ( 1 mol %) |

All the reactants were dissolved in 20 minutes by stirring at room temperature. A solution—prepared in the strict absence of moisture—of

| | |
|---|---|
| 6.1 g = 0.02 mol | cis-4,4'-stilbenedicarboxylic acid dichloride in |
| 20 ml | dichloromethane (unstabilized) | was then added with very rapid stirring, followed by stirring for 30 minutes at room temperature (20° C.). For working up, the organic phase was separated off, acidified with acetic acid, washed with distilled water until free from electrolyte, concentrated at room temperature and the residue obtained dried overnight at room temperature in a vacuum drying cabinet.

7.4 g of a transparent, colorless product having a relative solution viscosity of 1.85 (dichloromethane, 25° C., c=0.5 g/dl) were obtained. Transparent, tough films could be cast from solution in dichloromethane. Examination under a hot-stage microscope revealed a softening temperature of 200° C.

In characterization of the reaction product by differential thermoanalysis (DSC), a glass transition temperature of 173° C. is observed in a first heating. On continued heating, there is a highly exothermic transition ($\Delta H = -39$ J/m) with a peak maximum at 344° C. which may be attributed to isomerization or crystallization processes. In a second heating, there was no glass or melt transition up to a temperature of 400° C.

EXAMPLE 3

Preparation of a copolyester from cis-stilbenedicarboxylic acid dichloride/bisphenol-A/4,4'-dihydroxydiphenyl by the interfacial process The following substances were weighed under nitrogen into a 250 ml wave-breaker flask equipped with a KPG stirrer, nitrogen inlet and reflux condenser:

| | |
|---|---|
| 2.28 g = 0.01 mol | 2,2-bis-(4-hydroxyphenyl)-propane (bisphenol A) |
| 1.86 g = 0.01 mol | 4,4-dihydroxydiphenyl |
| 3.60 g = 0.0406 mol | conc. sodium hydroxide (45%) |
| 55 ml | distilled water |
| 25 ml | dichloromethane (unstabilized) |
| 0.07 g | tetrabutylammonium bromide ( 1 mol %) |

All the reactants were dissolved in 20 minutes by stirring at room temperature. A solution—prepared in the strict absence of moisture—of

| | |
|---|---|
| 6.1 g = 0.02 mol | cis-4,4'-stilbenedicarboxylic acid dichloride in |
| 30 ml | dichloromethane (unstabilized) | was then added dropwise over a period of 1 minute with rapid stirring, followed by stirring for 30 minutes at room temperature (20° C.).

For working up, the organic phase was separated off, acidified with acetic acid, washed with distilled water until free from electrolyte, concentrated at room temperature and the residue obtained dried overnight at room temperature in a vacuum drying cabinet.

6.4 g of a transparent, light yellow product were obtained, but could not be redissolved in dichloromethane. Examination with a hot-stage microscope revealed a softening temperature of 210° C.

In characterization of the reaction product by differential thermoanalysis (DSC), a glass transition temperature of 189° C. is observed in a first heating. On continued heating, there is a highly exothermic transition ($\Delta H = -70$ J/g) with a peak maximum at 339° C. which may be attributed to isomerization or crystallization processes. In a second heating, there is no glass or melt transition up to a temperature of 400° C.

EXAMPLE 4

Preparation of a polyamide from cis-stilbenedicarboxylic acid dichloride/1,4-diaminophenylene by the interfacial process The following substances were weighed under nitrogen into a 250 ml face-ground flask equipped with a face-ground cover, metal stirrer, nitrogen inlet and reflux condenser:

40 ml: N-methyl pyrrolidone (distilled)
12.0 g: Calcium chloride (dry)

The contents of the flask were stirred at room temperature (20° C.), after which 2.59 g=0.024 mol 1,4-diaminobenzene and 14.4 g dimethyl aniline were added. After stirring for 15 minutes, the stirrer speed was increased from 600 min$^{-1}$ to 2,000 min$^{-1}$ and 7.32 g=0.024 mol cis-4,4'-stilbenedicarboxylic acid dichloride were introduced in the strict absence of moisture, followed by purging with 20 ml N-methyl pyrrolidone. An exothermic reaction began immediately, accompanied by a large increase in viscosity. The viscous solution was diluted by addition of 50 ml N-methyl pyrrolidone, followed by stirring for 1 hour at room temperature (20° C.).

For working up, the reaction product was precipitated in 3 l water, filtered under suction, washed until free from electrolyte and boiled twice with 750 ml methanol. After filtration under suction and drying in vacuo for 16 hours (T=50° C.), 7.07 g of a fibrous, yellow-green product were obtained, its softening temperature determined by hotstage microscope being 170° C.

In characterization of the reaction product by differential thermoanalysis (DSC), a glass transition temperature of 170° C. is observed in a first heating. On continued heating, there is a highly exothermic transition ($\Delta H = -79$ J/g) with a peak maximum at 360° C. which

We claim:

1. A process for the production of low-melting polymers consisting essentially of at least one Z-configured (cis-configured) stilbene group, characterized in that Z-configured bifunctional stilbene compounds corresponding to formula

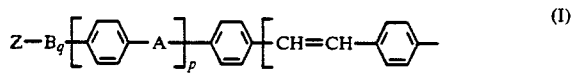

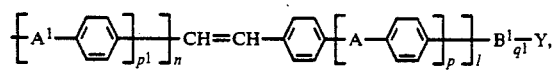

(I) in which

Z and Y are the same or different and represent COOR, COR, COCl, and R is hydrogen or $C_{1-8}$ alkyl, A and $A^1$ are the same or different and represent a chemical bond or A and A' are the same or different and represent CH=CH,

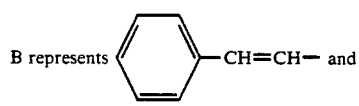

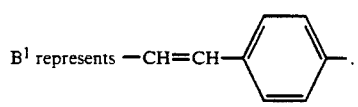

$l = 0$ or 1,
p and $p^1 = 0$ or 1,
q and $q^1 = 0$ or 1 and
n = 1 or 2, wherein the sum of l, p, $p^1$, q, $q^1$ and n is greater than 0 are reacted with dihydroxy compounds corresponding to the formula (II)

$$HO-Ar-(X)_o-(Ar)_p-OH \quad (II),$$

in which

Ar represents $C_{6-18}$ aromatic radicals which are optionally be substituted by halogen (F, Cl, Br), $C_{1-4}$ alkyl, $C_{1-4}$ alkoxy, $C_{6-10}$ aryl or $C_{6-10}$ aryloxy radicals, X represents —CO—, —SO$_2$—, —S—, —CH$_2$—, —C(CH$_3$)$_2$—, and alkylene or alkylidene radical containing 2 to 20 carbon atoms and o and p = 0 or 1 at temperatures in the range from $-30°$ to 250° C., optionally in the presence of organic solvents, diluents, or catalysts, the Z-configuration of the stilbene units remaining intact.

2. A process as claimed in claim 1, characterized in that the reaction is carried out at temperatures in the range from $-10°$ to 100° C.

3. High-melting plastic article comprising the low-melting polymers containing at least one Z-configured stilbene group produced by the process claimed in claim 1.

4. A process according to claim 1 wherein the stilbene compound is cis-stilbenedicarboxylic acid dichloride and the dihydroxy compound is 4,4′, -dihydroxydiphenyl ether.

5. A process according to claim 1 wherein the stilbene compound is cis-stilbenedicarboxylic acid dichloride and the dihydroxy compound is bisphenol A.

6. A process according to claim 1 wherein the stilbene compound is cis-stilbenedicarboxylic acid dichloride and the dihydroxy compounds are bisphenol A and 4,4′,-dihydroxydiphenyl ether.

7. A process according to claim 1 wherein the stilbene compound is cis-stilbenedicarboxylic acid dichloride and the dihydroxy compound is 1,4-diaminophenylene.

* * * * *